US009534436B2

(12) United States Patent
Osafune (10) Patent No.: US 9,534,436 B2
(45) Date of Patent: Jan. 3, 2017

(54) DRIVING DEVICE FOR OPENING AND CLOSING

(71) Applicant: HI-LEX CORPORATION, Hyogo (JP)

(72) Inventor: Hitoshi Osafune, Takarazuka (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 14/439,577

(22) PCT Filed: Oct. 30, 2013

(86) PCT No.: PCT/JP2013/079432
§ 371 (c)(1),
(2) Date: Apr. 29, 2015

(87) PCT Pub. No.: WO2014/069532
PCT Pub. Date: May 8, 2014

(65) Prior Publication Data
US 2015/0300071 A1    Oct. 22, 2015

(30) Foreign Application Priority Data

Oct. 31, 2012    (JP) ................................. 2012-240515

(51) Int. Cl.
*F16H 3/06*     (2006.01)
*E05F 15/622*   (2015.01)
(Continued)

(52) U.S. Cl.
CPC ......... *E05F 15/622* (2015.01); *F16H 25/2454* (2013.01); *H02K 7/06* (2013.01);
(Continued)

(58) Field of Classification Search
CPC ................ E05F 15/622; F16H 25/2454; F16H 2025/2043; H02K 7/06; E05Y 2201/216; E05Y 2201/218; E05Y 2201/462
See application file for complete search history.

(56) References Cited

U.S. PATENT DOCUMENTS 5,694,812 A * 12/1997 Maue .................. B60N 2/0248
                                                  15/250.01
6,042,571 A *  3/2000 Hjertman .......... A61M 5/14566
                                                     604/208
(Continued)

FOREIGN PATENT DOCUMENTS

JP        2726185 B    3/1998
JP    2004-175211 A    6/2004
(Continued)

OTHER PUBLICATIONS

International Search Report in PCT/JP2013/079432 dated Dec. 17, 2013.

Primary Examiner — William Kelleher
Assistant Examiner — Zakaria Elahmadi
(74) Attorney, Agent, or Firm — Global IP Counselors, LLP (57) ABSTRACT

A driving device for opening and closing an opening/closing body of a vehicle. The driving device comprises a nut member that moves linearly by way of rotation of a rod member and is threadably engaged with the rod member, and an engaging member that can be engaged with an engagement-receiving member provided on the rod member that is moved by way of a link arm linked to actuation of a solenoid such that rotation of the rod member can be stopped. The link arm has a mechanical structure that limits vibrations that change the vibration status of the engaging member. By using this driving device, impact noise during actuation of the driving device can be mitigated, or the pitch of the noise can be altered, so as not to discomfort passengers.

4 Claims, 8 Drawing Sheets

(51) Int. Cl.
  *F16H 25/24* (2006.01)
  *H02K 7/06* (2006.01)
  *F16H 25/20* (2006.01)

(52) U.S. Cl.
  CPC ... *E05Y 2201/216* (2013.01); *E05Y 2201/218* (2013.01); *E05Y 2201/462* (2013.01); *E05Y 2800/25* (2013.01); *E05Y 2900/546* (2013.01); *F16H 2025/209* (2013.01); *F16H 2025/2043* (2013.01); *F16H 2025/2071* (2013.01)

(56) References Cited

U.S. PATENT DOCUMENTS

| | | | | |
|---|---|---|---|---|
| 6,240,797 | B1* | 6/2001 | Morishima | F16H 25/2454 188/134 |
| 6,394,616 | B1* | 5/2002 | Foote | B60R 1/074 248/480 |
| 6,557,583 | B2* | 5/2003 | McCabe | A62C 2/14 137/601.09 |
| 7,721,624 | B2* | 5/2010 | Tanaka | F16H 61/32 74/606 R |
| 8,336,818 | B2* | 12/2012 | Flatt | B64C 13/28 244/99.2 |
| 2004/0261559 | A1* | 12/2004 | Ozaki | F16H 61/32 74/473.12 |
| 2005/0155444 | A1* | 7/2005 | Otaki | B60T 13/746 74/89 |
| 2009/0200830 | A1* | 8/2009 | Paton | B60J 5/101 296/146.8 |
| 2012/0234117 | A1* | 9/2012 | Oswald | E21B 41/0007 74/89.39 |
| 2013/0264399 | A1* | 10/2013 | Wingett | F02K 1/625 239/265.19 |

FOREIGN PATENT DOCUMENTS

| | | |
|---|---|---|
| JP | 2005-194793 A | 7/2005 |
| JP | 2009-155900 A | 7/2009 |
| JP | 2010-270886 A | 12/2010 |

* cited by examiner

DRIVING DEVICE FOR OPENING AND CLOSING

CROSS-REFERENCE TO RELATED APPLICATIONS

This U.S. National stage application claims priority under 35 U.S.C. 119(a) to Japanese Patent Application No. 2012-240515, filed in Japan on Oct. 31, 2012, the entire contents of Japanese Patent Application No. 2012-240515 are hereby incorporated herein by reference.

BACKGROUND

Field of the Invention

The present invention relates to a driving device for opening and closing an opening/closing body arranged at an opening of a vehicle. More specifically, the present invention relates to a driving device for opening and closing a back door or a trunk door (trunk lid) of a vehicle such as a car, etc.

Background Information

Many of vehicles such as cars, etc. include opening/closing bodies such as back doors or trunk doors (trunk lids) that open in a flip-up direction from back openings. In order to increase accessibilities, improve security, and/or etc., a number of vehicles including opening/closing apparatuses to open and close the open/close bodies with an electric power has been increasing.

The opening/closing body, which opens in the flip-up direction, requires a space for opening and closing operations, and sometimes needs to be stopped at an arbitrary position in order to prevent the door in opening/closing operations from touching an obstacle and/or a person or reduce the amount of the opening of the opening/closing body due to strong wind and/or rain.

There is for example a driving devices for opening and closing the opening/closing in which a ball screw mechanism, which converts a rotation of an electric motor to a linear movement, is used. The driving devices for opening and closing in which such ball screw mechanism is used can stop the opening/closing body at arbitrary positions with a lock pin that engages with a rotation-side member of the ball screw mechanism in accordance with a movement of a plunger of a solenoid (See JP 2010-270886 A, for example).

SUMMARY

In the above-described driving device for opening and closing, an impulsive noise is generated when a movable iron core, which is the plunger of the solenoid, is attracted electromagnetically and collides with a fixed iron core in a casing. Otherwise, an impulsive noise is generated when the lock pin engages with the rotation-side member of the ball screw mechanism in response to the movement of the plunger.

Since these impulsive noises are loud enough to be heard by a user and they are metallic clanks with higher tones, they make the vehicle less luxury and give the user a negative feeling such that the user feels uncomfortable to these noises. In addition, if a silence solenoid is used, the problem arises that the solenoid cannot generate a power large enough for the opening/closing apparatus used in a vehicle.

The object of the present invention is to reduce a noise that influences negatively to a user, such as a noise that makes the vehicle less luxury, by reducing an impulsive noise generated in the operation of a driving device for opening and closing or changing the tone range of the impulsive noise.

Aspects of the present invention to solve the problem will be described below. These aspects can be combined arbitrarily as desired.

A driving device for opening and closing according to one aspect of the present invention includes a motor, a rod member, a clutch, a nut member, a connection member, and a rotation inhibiting means. Male threads are formed on the outer surface of the rod member. The clutch is configured to transmit or cut a rotation power of the motor to the rod member. The nut member is screwed with the rod member and configured to move linearly by the rotation of the rod member. The connection member is configured to open and close an opening/closing body by the linear movement of the nut member. The rotation inhibiting means is configured to inhibit the rotation of the rod member. The rotation inhibiting means has an engagement member, an engaged portion, a solenoid, and a link member. The engagement member is configured to move between an engagement position and an engagement release position. The engaged portion is arranged on the rod member and configured to inhibit the rotation of the rod member by engaging with the engagement member. The solenoid is configured to move the engagement member. The link member is configured to move the engagement member in accordance with the movement of the solenoid. The link member has a mechanical structure that is configured to reduce a vibration by changing a vibration condition of the engagement member.

According to the driving device for opening and closing having the above-described structure, since the rotation inhibiting means, which has the engagement member that is configured to move between the engagement position and the engagement release position, and the engaged member that is configured to inhibit the rotation of the rod member by engaging with the engagement member, engages mechanically, the opening/closing body can be stopped securely at arbitral positions without reducing the durability of the clutch. In this case, the existence of the link member that is configured to move the engagement member in accordance with the movement of the solenoid can reduce a noise generated due to the movement of the solenoid or change the tone interval by changing the vibration condition of the engagement member to reduce the vibration, thus an uncomfortable feeling of the user can be reduced.

Here, the engagement member can be formed in a convex shape and to move in a direction perpendicular to an axis direction of the rod member. In addition, the engaged portion can be formed as a plurality of concaves arranged on an outer periphery of the rod member, the concaves being provided defining a predetermined space in a rotation direction of the rod member with each other.

In this case, the mechanical engagement of the engagement member with the engaged portion can stop the opening/closing body securely at arbitral positions.

The mechanical structure can be formed as a movement inhibiting portion that is configured to apply a force to the link member in the direction different from the direction of the movement of the link member generated by the movement of the solenoid. The movement inhibiting portion can reduce the noise generated due to the movement of the solenoid or change the tone range of the noise by applying the force to the link member in the direction different from the direction of the movement of the link member.

The movement inhibiting portion can be a weight that is arranged in the vicinity of an end portion of an elongating member that is attached to the link member. By arranging the weight in the vicinity of the end portion of the elongating member, due to the gravitational acceleration of the weight, the force can be applied to the link member in the direction different from the direction of the movement of the link member generated by the movement of the solenoid. Consequently, the above-described effect can be achieved.

In the present invention, the engagement of the engaged member with the engagement member can inhibit the rotation of the rod member and stop the opening/closing body at the intermediate position. In this case, since the mechanical structure, which inhibits a vibration that changes the vibration condition of the engagement member, is arranged in the link member that moves the engagement member in accordance with the movement of the solenoid, the uncomfortable feeling of the user can be reduced by reducing the generated impulse noise or changing the tone range of the impulse noise.

DETAILED DESCRIPTION OF EMBODIMENTS

Figure 1:
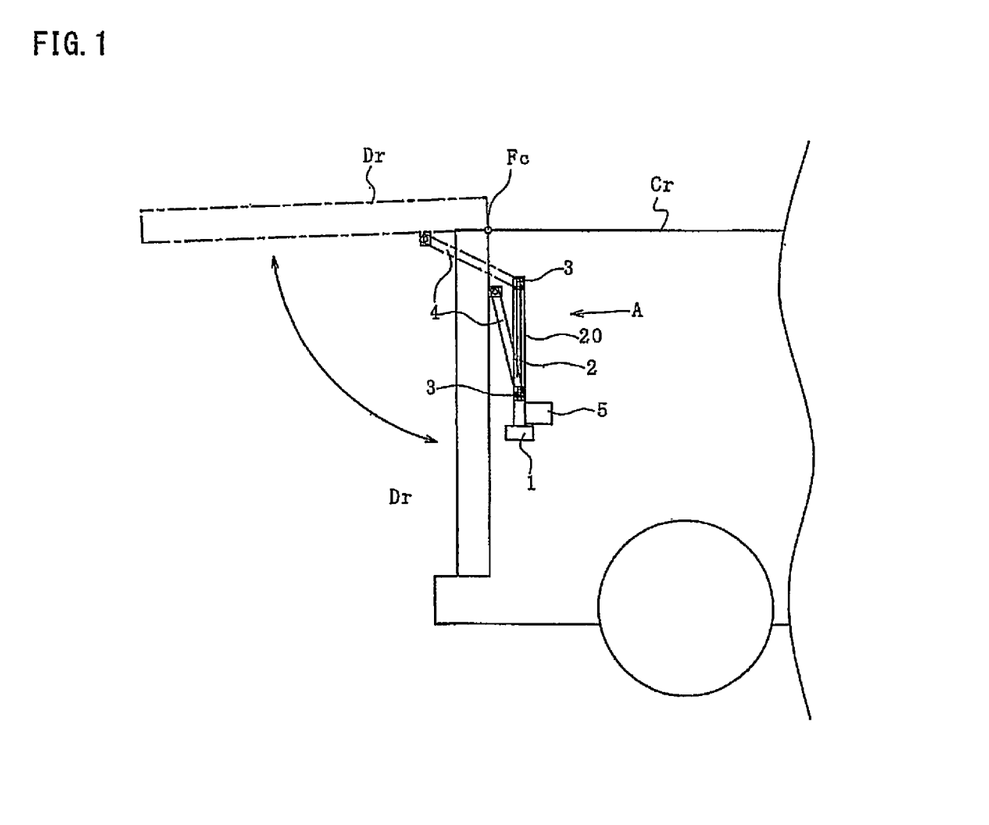
FIG. 1 is a schematic view illustrating a back portion of a vehicle where a driving device for opening and closing according to the present invention is used.
Figure 2:
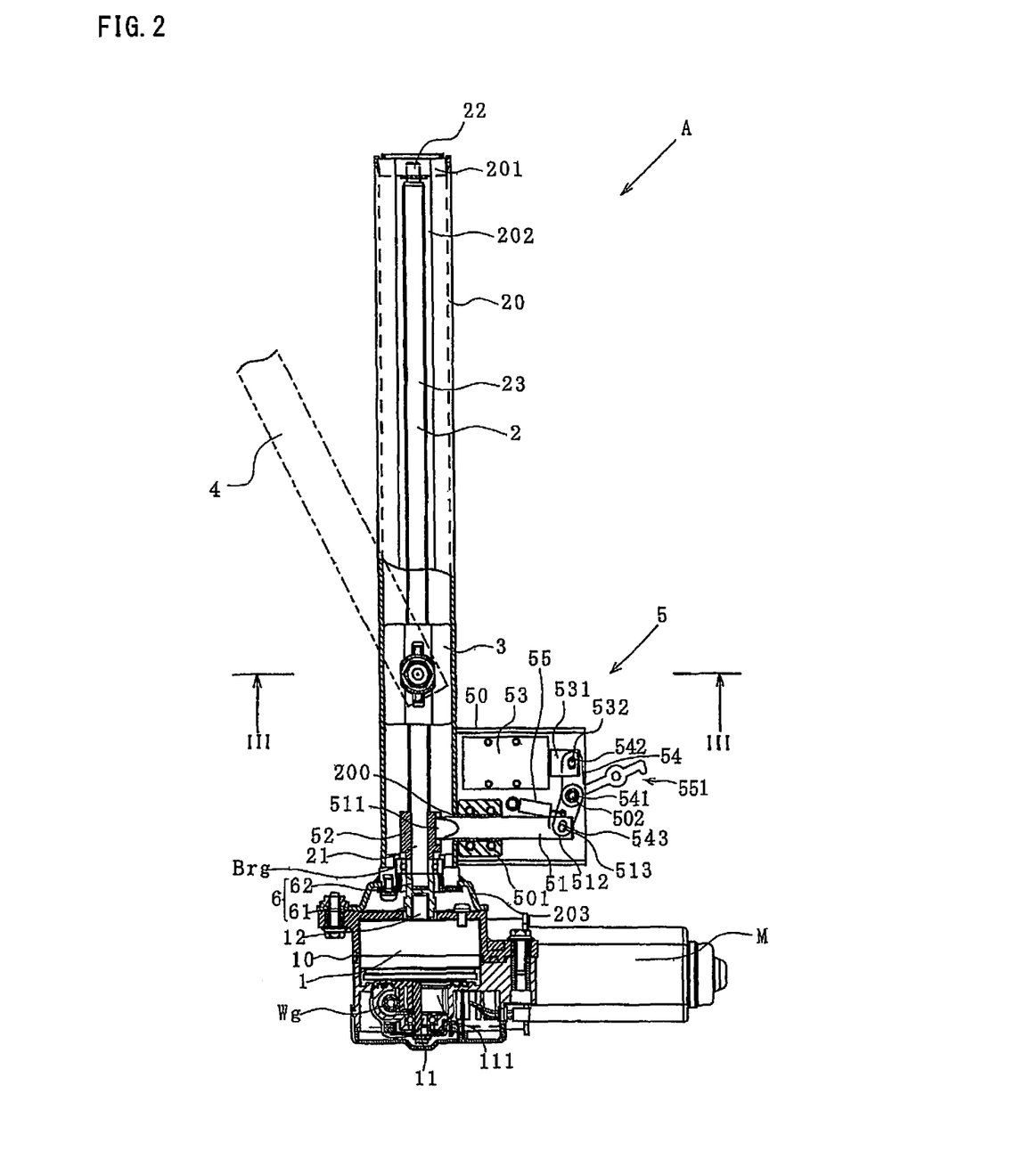
FIG. 2 is a front view of a driving device for opening and closing according to the present invention.

In the following, an embodiment of the present invention will be described with reference to accompanying drawings. FIG. 1 is a schematic view illustrating a back portion of a vehicle where a driving device for opening and closing according to the present invention is used. FIG. 2 is a front view of a driving device for opening and closing according to the present invention.

A driving device for opening and closing A shown in FIG. 1 is a device that is arranged inside a vehicle Cr and opens and closes an opening/closing body Dr that is rotatably connected to a supporting point Fc that is arranged at the upper end of a back opening portion of the vehicle Cr. It should be noted that, in the vehicle Cr, the opening and closing of the opening/closing body Dr is performed only by the driving device for opening and closing A. However, not limited to this, the driving device for opening and closing A and a damper that helps the movement of the opening/closing body Dr can be used. In the following, the driving device for opening and closing A according to the present invention will be described with reference to the drawings.

As shown in FIG. 2, the driving device for opening and closing A according to the present invention includes a motor M, a clutch 1, a rod member 2, a nut member 3, a connection member 4, and a rotation inhibiting unit 5 (a rotation inhibiting means). The rotation inhibiting unit 5 has an engagement member 51 and an engaged member 52. In the following, the details of each element of the driving device for opening and closing A according to the present invention will be described. It should be noted that, in the driving device for opening and closing A shown in FIG. 2, for ease of understanding, the angle of a part of the motor M is changed from the actual angle and the cross sectional view of the part is shown in FIG. 2.

As shown in FIG. 2, the clutch 1 is an electromagnetic clutch that is arranged inside a housing 10. The clutch 1 has a well-known structure and has an input shaft 11 and an output shaft 12 as shown in FIG. 2. The clutch 1 has a coil (not shown) inside and, when electric current is flown in the coil, the input shaft 11 and the output shaft 12 are connected to transmit a rotation power (torque). On the other hand, when electric current is not flown in the coil, the input shaft 11 is isolated from the output shaft 12 to stop the transmission of the rotation power (torque).

A worm wheel 111, which is geared with a worm gear Wg attached to a rotation shaft of the motor M, is fixed to the input shaft 11 of the clutch 1. Thus, the rotation power generated by the rotation shaft of the motor M is transmitted to the input shaft 11 via the worm gear Wg and the worm wheel 111. It should be noted that the reduction ratio in transmitting the rotation power from the motor M to the input shaft 11 can be adjusted by adjusting shapes of the worm gear Wg and the worm wheel 111. In FIG. 2, for ease of understanding, the rotation shaft of the motor M is shown in the direction perpendicular to the paper face of FIG. 2, however, the actual rotation shaft extends from the center of the motor M.

The output shaft 12 of the clutch 1 is connected to the rod member 2 via a joint member 6. The joint member 6 has a clutch engagement portion 61 into which the output shaft 12 of the clutch 1 is engaged and a rod fixing portion 62 that fixes the rod member 2. The clutch engagement portion 61 is a cylindrical member and the output shaft 12 of the clutch 1 is inserted inside the clutch engagement portion 61. A concave spline (not shown in the Figure) that protrudes in the circumferential direction and extends in parallel to the rotation axis is formed on the outer periphery of the output shaft 12 of the clutch. In addition, the clutch engagement portion 61 has a concave groove (not shown in the Figure) where the spline is engaged on its inner periphery. Thus, if the output shaft 12 rotates, the rotation power of the output shaft 12 is transmitted to the joint member 6 due to the engagement of the spline with the concave groove.

As shown in FIG. 2, the rod member 2 is rotatably arranged inside a guide rail 20. The rod member 2 is a columnar member and has a cylindrical connection portion 21 that is formed at one end, a supported portion 22 that is formed at the opposite end to the connection portion 21, and a screw portion 23 that is a part between the connection portion 21 and the supported portion 22.

The guide rail 20 is the member that is formed by folding a metal plate in a U-shape or in a channel-with-limb shape. As shown in FIG. 2, an opening 202, which continues in the longitudinal direction, is formed on the side surface of the guide rail 20. In addition, a set plate 201 is attached to the longitudinal tip of the guide rail 20 and a bracket 203 which is attached to the housing 10 of the clutch 1 is fixed to the opposite end. The connection portion 21 is rotatably supported by the bracket 203 via a bearing Brg and the supported portion 22 is rotatably supported by the set plate 201.

Thus, since both end portions (the connection portion 21 and the supported portion 22) of the rod member 2 are rotatably supported by the bracket 203 and the set plate 201 that are arranged at both ends of the guide rail 20, the rod member 2 is rotatably supported inside the guide rail 20. Then, the bracket 203 is fixed to the housing 10 by a screw.

The connection portion 21 is inserted and fixed into a rod fixing portion 62 that is a concave hole formed in the joint member 6. Since the joint member 6 is connected to the output shaft 12 of the clutch 1, the connection portion 21 is connected to the output shaft 12 via the joint member 6. In this case, it is preferable that the rotation center of the output shaft 12 of the clutch 1 coincides in high accuracy with the rotation center of the rod member 2. For this, for fixing the rod fixing portion 62 and the connection portion 21, any fixing methods that can inhibit the misalignment of the shafts, such as press fitting, welding, the connection by using a key, and etc., can be used. It should be noted that, in the driving device for opening and closing A according to the present invention, the fixing method in which the rod fixing portion 62 and the connection portion 21 are crimped (caulked) by applying a pressure from outside of the rod fixing portion 62 into which the connection portion 21 is inserted.

In addition, as shown in FIG. 2, other than the rod fixing portion 62 of the joint member 6, the bearing Brg and an engaged member 52 of the rotation inhibiting unit 5 are attached to the connection portion 21. The connection portion 21 is connected with the engaged member 52 with a key 500, and a key groove 211 (see FIG. 7) in which the key 500 is inserted is formed on the outer periphery of the connection portion 21. It should be noted that the connection method of the engaged member 52 and the connection portion 21 is not limited to the method in which the key is used and the connection may be achieved by press fitting, welding, or etc. The bearing Brg is a well-known ball bearing, fixed to the bracket 203, and rotatably supports the connection portion 21 of the rod member 2.

The supported portion 22 is rotatably inserted into the concave hole that is formed in the set plate 201 that is attached to the tip of the guide rail 20. Since the supported portion 22 is supported by the set plate 201, the fluctuation of the tip side of the rod member 2 is inhibited and the deflection of the rod member 2 is inhibited. It should be noted that, in the driving device for opening and closing A shown in FIG. 2, the supported portion 22 is only inserted into the concave hole, however the supported portion 22 may be attached via a ball bearing.

It should be noted that, in the driving device for opening and closing A shown in FIG. 2, the connection portion 21 and the supported portion 22 are cylinders with smaller outer diameter than that of the screw portion 23, however not limited to this, they may be cylinders with larger outer diameter than that of at least the screw portion 23. Since the connection portion 21 and the supported portion 22 with smaller outer diameter than that of the screw portion 23 are easier to produce when the rod member 2 is produced by machining a cylindrical metal bar, in the driving device for opening and closing A, the outer diameter of the connection portion 21 and the supported portion 22 is set smaller than that of the screw portion 23. Male threads are formed on the outer periphery of the screw portion 23 and screwed with later-described female-thread portion 31 of the nut member 3.

Figure 3:
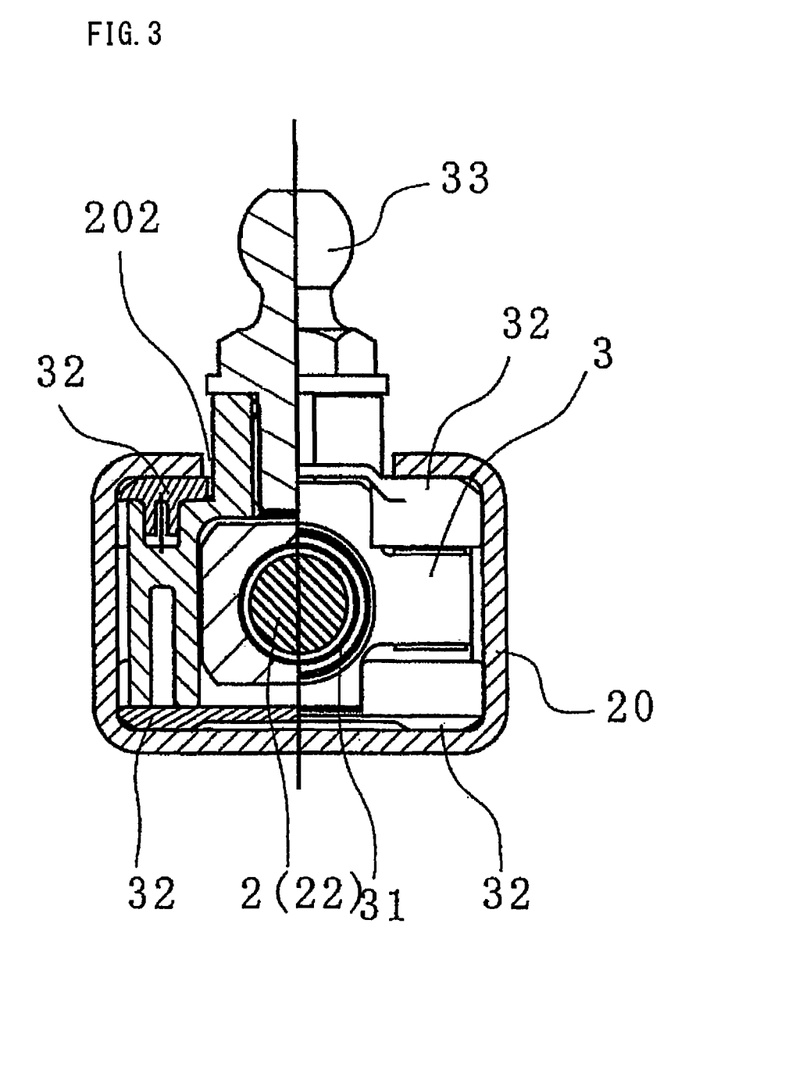
FIG. 3 is a cross sectional view of a driving device for opening and closing illustrated in FIG. 2 when cut with an III-III line.

FIG. 3 is a cross sectional view of the driving device for opening and closing illustrated in FIG. 2 when cut with an line. In FIG. 3, the cross section of the left half of the nut member 3 is shown.

As shown in FIG. 3, the nut member 3 has a female-threaded portion 31, a lining 32, and a stud portion 33. The female-threaded portion 31 is screwed with the male threads of the screw portion 23. The lining 32 touches the inside of the guide rail 20. The stud portion 33 protrudes from the opening 202 formed in the guide rail 20 and rotatably supports the connection member 4.

The female-threaded portion 31 is formed separately from a main body of the nut member 3 and fixed so as to pass through a central portion of the main body of the nut member 3. Since the female-threaded portion 31 is screwed with the screw portion 23, the female-threaded portion 31 is moved linearly in the direction along the axis of the rod member 2 by the rotation of the rod member 2. Thus, the nut member 3 having the female-threaded portion 31 is guided by the rod member 2 and the guide rail 20, and is moved in the direction along the axis of the rod member 2. It should be noted that the female-threaded portion 31 may be female threads formed integrally with the main body of the nut member 3.

Since the female-threaded portion 31 touches the male-threaded part of the screw portion 23, they are greased in order to reduce the friction between the female-threaded portion 31 and the male-threaded part of the screw portion 23. Thus, the wear and the heat generation of the female-threaded portion 31 and/or the male-threaded part of the screw portion 23 can be reduced. In addition, the electric power required to drive the motor M can also be reduced because the energy loss due to the friction is small.

It should be noted that the part where the female-threaded portion 31 touches the male-threaded part of the screw portion 23 may be lubricated by lubricant other than grease, and no lubricant may be used if the female-threaded portion 31 and/or the screw portion 23 are made of materials with smaller friction.

In addition, the lining 32 inhibits backlash and torsion of the nut member 3 by touching the guide rail 20 when the nut member 3 moves. By greasing between the lining 32 and the guide rail 20, the wear of the lining 32 and/or the guide rail 20 can be reduced.

It should be noted that the lubrication of the lining 32 with lubricants such as grease can be omitted if the lining 32 is made of materials with smaller coefficients of friction such as a fluorine-based resin. In addition, by making the lining 32 easy to attach or detach, the replacement of the lining 32 due to the wear can be easy. Thus, even if the nut member 3 shakes and/or distorts, the backlash and/or torsion of the nut member 3 can be adjusted by replacing only the lining 32, consequently, the process can be reduced in comparison with replacing the whole of the nut member 3.

The connection member 4 is the member that performs an opening/closing operation of the opening/closing body Dr by the linear movement of the nut member 3. The connection member 4 is a long-bar-like member, one end of the connection member 4 is rotatably supported by the stud portion 33 and another end is rotatably supported by the opening/closing body Dr. The opening/closing body Dr and the driving device for opening and closing A form a link mechanism, the linear movement of the nut member 3 pushes (pulls) the opening/closing body Dr via the connection member 4, and the opening/closing body Dr opens or closes around the supporting point Fc. The details of the opening/closing operation of the opening/closing body Dr will be described later.

Figure 4:
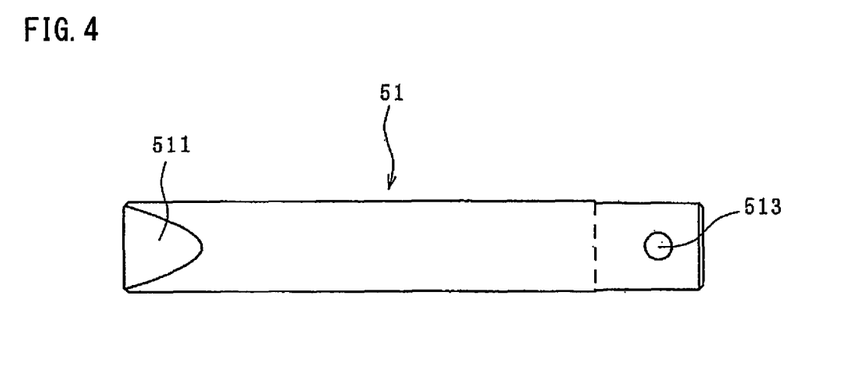
FIG. 4 is a front view of one example of an engagement member.
Figure 5:
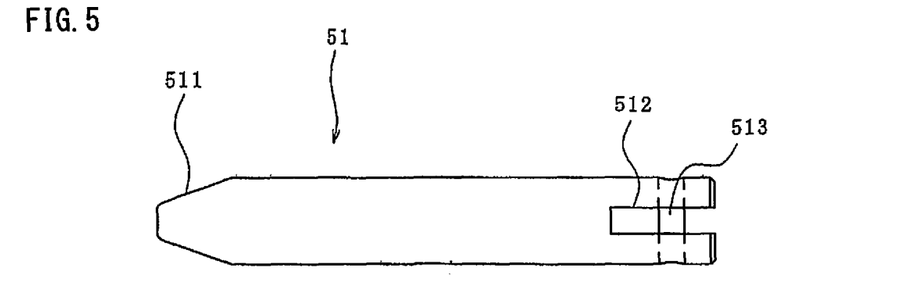
FIG. 5 is a side view of the engagement member illustrated in FIG. 4.
Figure 6:
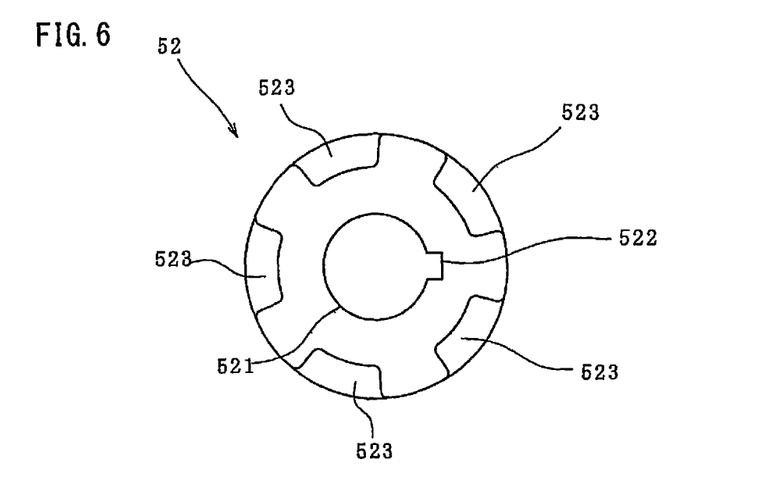
FIG. 6 is a view of one example of an engaged member seen from the axis direction.
Figure 7:
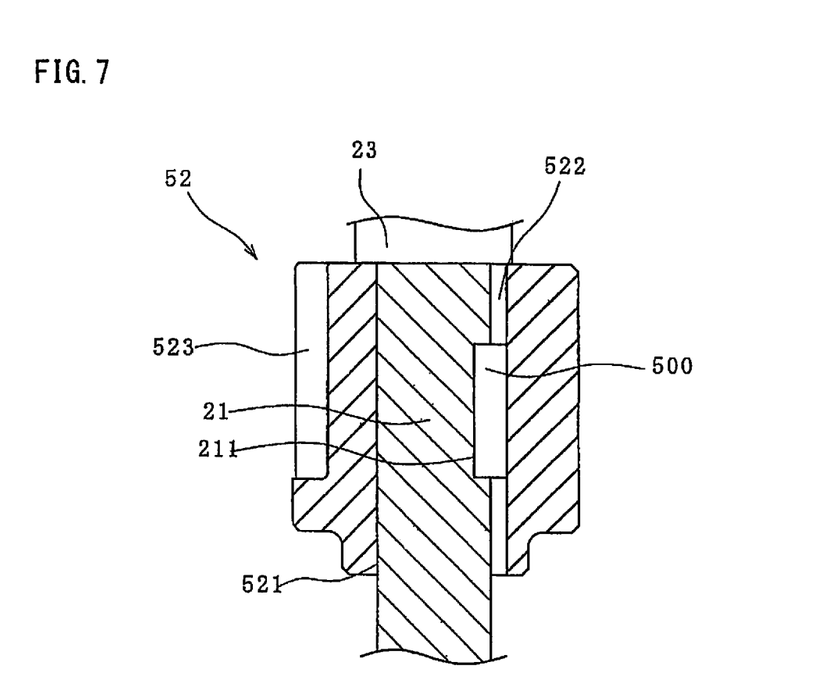
FIG. 7 is a cross sectional view of the engagement member illustrated in FIG. 6 cut along the axis.

The rotation inhibiting unit 5 stops the movement of the nut member 3 by inhibiting the rotation of the rod member 2. FIG. 4 is a front view of one example of the engagement member. FIG. 5 is a side view of the engagement member illustrated in FIG. 4. FIG. 6 is a view of one example of the engaged member seen from the axis direction. FIG. 7 is a cross sectional view of the engagement member illustrated in FIG. 6 cut along the axis.

As shown in FIG. 2 and FIG. 4, the rotation inhibiting unit 5 has a case 50 that is hollow and parallelepiped, the engagement member 51 that is arranged such that it can reciprocate linearly inside the case 50, the engaged member 52 that is attached to the connection portion 21 of the rod member 2, a solenoid 53 that outputs the driving power to move the engagement member 51, and a link arm 54 (one example of a link member) that connects the engagement member 51 with the solenoid 53 and transmits the movement of the solenoid 53 to the engagement member 51.

The case 50 is fixed to the guide rail 20 such that the engagement member 51 can pass through a through-hole 200 that is formed in the vicinity of the end portion of the guide rail 20 at the clutch 1 side. It should be noted that the case 50 is fixed to the guide rail 20 such that the engagement member 51 can move in the direction perpendicular to the direction of the central axis of the rod member 2. In addition, the case 50 has a movement guide 501, which guides the movement of the engagement member 51, and a supporting shaft 502, which rotatably supports the link arm 54.

The engagement member 51 can move between an engagement position P2 and an engagement release position P1, as described later. As shown in FIG. 4 and FIG. 5, the engagement member 51 is the cylindrical member that has an engagement portion 511, a concave groove 512 that is formed at the side opposite to the engagement portion 511, and a supporting shaft 513 that has also the concave groove 512.

The engagement portion 511 has two inclined planes that are arranged such that they sandwich the central axis. The two inclined planes of the engagement portion 511 are formed in a convex shape such that they approach each other as they extend to the tip and these two inclined planes have the same angle of inclination as that of side walls of an engagement concave portion 523 which will be described later.

The concave groove 512 is the groove that passes through the engagement portion 511 in the radial direction, and the supporting shaft 513 is arranged such that it crosses a part of the concave groove 512. As shown in FIG. 4 and FIG. 5, the supporting shaft 513 is arranged such that it crosses (at right angles) the concave groove 512 and the supporting shaft 513 passes through the engagement member 51. The supporting shaft 513 passes through an engagement portion connection hole 543 of the link arm 54 which will be described later. It should be noted that the shape of the engagement member 51 is not limited to cylinder, and the shape may be a column with a polygonal (hexagonal, for example) cross section.

The engaged member 52 is the member that inhibits the rotation of the rod member 2 by engaging with the engagement member 51. As described above, the engaged member 52 is arranged on the outer periphery of the rod member 2 and fixed to the connection portion 21. As shown in FIG. 6 and FIG. 7, the engaged member 52 is a cylindrical member and has a through-hole 521, a through-groove 522, and engagement concave portions 523. The connection portion 21 of the rod member 2 passes through the through-hole 521. The through-groove 522 is formed on the inner surface of the through-hole 521 and passes through between both end portions in the axis direction. The engagement concave portions 523 are the concave portions that are arranged in the rotation direction of the rod member 2 while each defining the predetermined spaces between each other.

It should be noted that five engagement concave portions are formed in the circumferential direction, however the number of the engagement concave portions is not limited to this, more engagement concave portions may be formed, or less engagement concave portions may be formed. Although it needs more processes and takes more time to form larger numbers of the engagement concave portions, larger numbers of the engagement concave portions can adjust the stopping angle of the rod member 2 in higher accuracy. Although it needs less processes and takes less time to form smaller numbers of the engagement concave portions, smaller numbers of the engagement concave portions reduces the accuracy of the stopping angle of the rod member 2. In addition, although the engaged member 52 is produced as a separated member from the rod member 2 and is attached to the rod member 2 in the driving device for opening and closing A, the engaged member 52 may be formed integrally with the rod member 2.

The engaged member 52 is attached to the connection portion 21 as follows. First, the key 500 is inserted into the key groove 211 of the connection portion 21. Since the key 500 is a parallelepiped member and the key groove 211 is formed in parallel to the axis of the rod member 2, the key 500 inserted into the key groove 211 is arranged in parallel to the axis of the rod member 2. The engaged member 52 is attached to the connection portion 21 such that the key 500 is fitted with the through-groove 522 of the engaged member 52. As such, since the key 500 engages with both the key groove 213 and the through-groove 522 in the circumferential direction, the movement of the engaged member 52 in the circumferential direction with respect to the rod member 2 can be inhibited.

The solenoid 53 is the apparatus that moves the engagement member 51. As shown in FIG. 2, the solenoid 53 is the actuator that drives a movable pin 531 by electric power. The solenoid 53 is a self-holding solenoid and holds the position of the movable pin 531 when the movable pin 531 is at the protruded position or the retracted position even if the electric power is cut. A link pin 532, which passes through a solenoid connection hole 542 which will be described later, is arranged at the protruded tip of the movable pin 531.

The link arm 54 is the member that moves the engagement member 51 in accordance with the movement of the solenoid 53. The link arm 54 is the planar member that bends at the center, and the supported hole 541, through which the supporting shaft 502 passes, is formed at the center. In addition, a long-hole-shaped solenoid connection hole 542, through which the link pin 532 of the solenoid 53 passes, is formed at one end of the link arm 54. A long-hole-shaped engagement portion connection hole 543, through which the supporting shaft 513 of the engagement member 51 passes, is formed at another end of the link arm 54.

The link arm 54 is supported at the supported hole 541 such that the link arm 54 can rotate around the supporting shaft 502, thus one end moves in the direction opposite to the direction of the movement of another end across the supported hole 541. In addition, as shown in FIG. 2, a damper 55 is attached to the link arm 54 to reduce the speed of the link arm 54. The damper 55 may be omitted.

As shown in FIG. 2, in the rotation inhibiting unit 5, the engagement member 51 and the solenoid 53 are arranged in parallel. The direction of the movement of the engagement member 51 is parallel to the direction of the movement of the movable pin 531 of the solenoid 53, and the movable pin 531 is connected with the link arm 54 such that the link pin 532 of the movable pin 531 passes through the solenoid connection hole 542 of the link arm 54. In addition, the engagement member 51 is connected with the link arm 54 such that the supporting shaft 513 of the engagement member 51 passes through the engagement portion connection hole 543 of the link arm 54.

Figure 8:
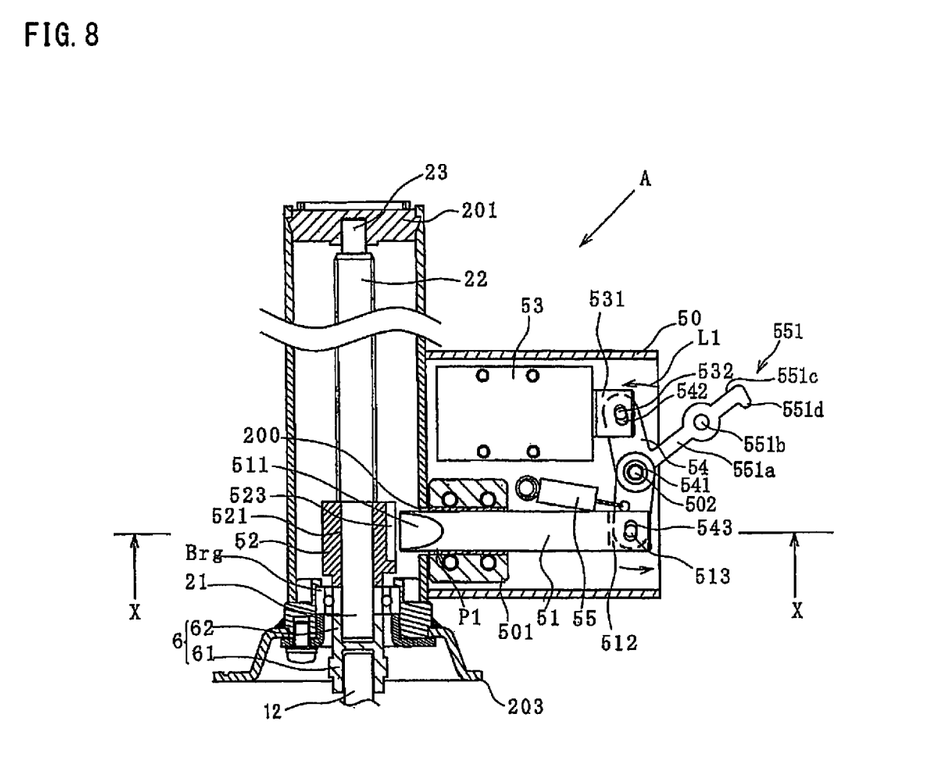
FIG. 8 is a cross sectional view of a part of a driving device for opening and closing in which an engagement member is not engaged with an engaged member.
Figure 9:
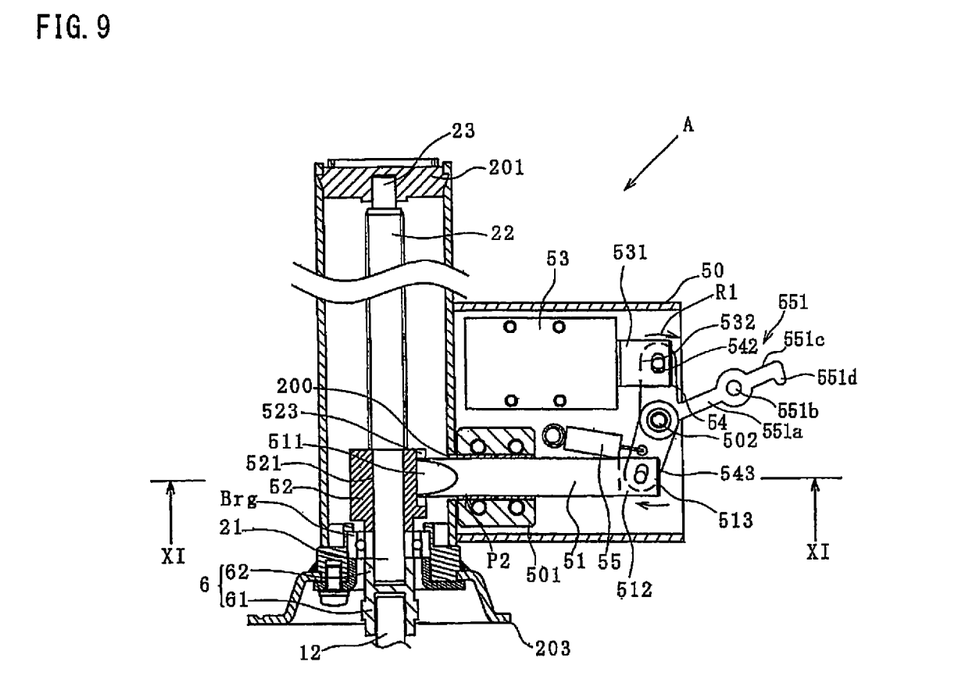
FIG. 9 is a cross sectional view of a part of a driving device for opening and closing in which an engagement member is engaged with an engaged member.
Figure 10:
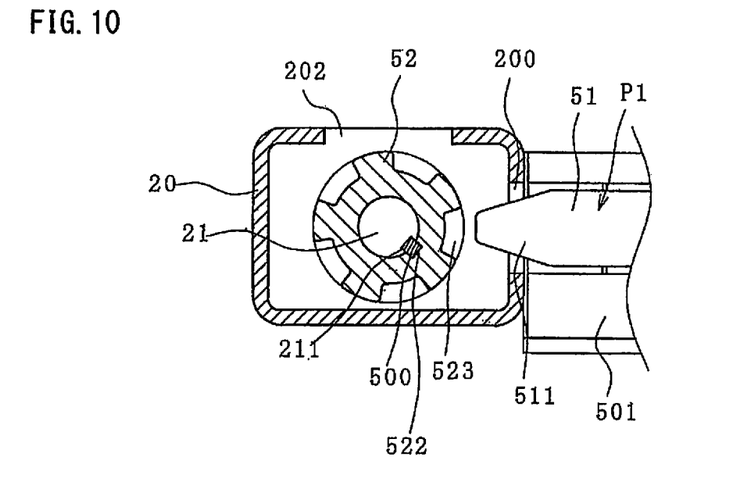
FIG. 10 is a cross sectional view of the rotation inhibiting unit illustrated in FIG. 8 cut with an X-X line.
Figure 11:
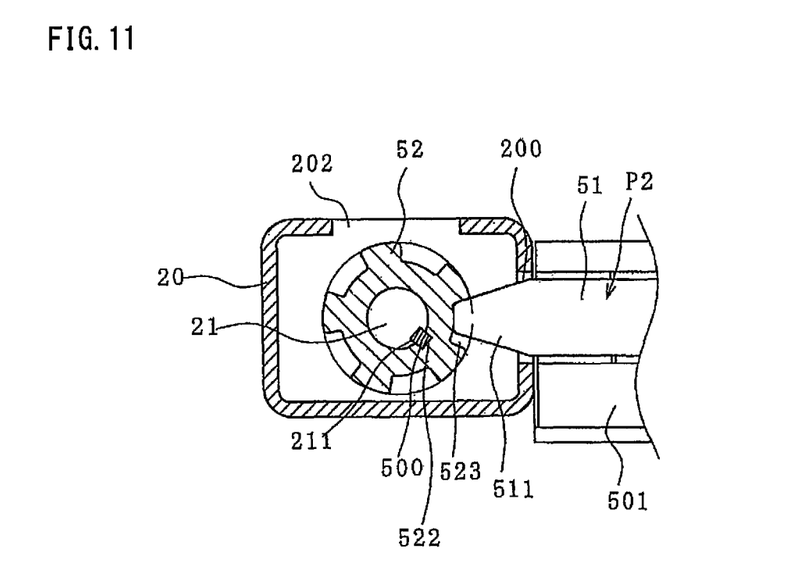
FIG. 11 is a cross sectional view of the rotation inhibiting unit illustrated in FIG. 9 cut with an XI-XI line.

FIG. 8 is a cross sectional view of a part of the driving device for opening and closing in which the engagement member is not engaged with the engaged member. FIG. 9 is a cross sectional view of a part of the driving device for opening and closing in which the engagement member is engaged with the engaged member. FIG. 10 is a cross sectional view of the rotation inhibiting unit illustrated in FIG. 8 cut with an X-X line. FIG. 11 is a cross sectional view of the rotation inhibiting unit illustrated in FIG. 9 cut with an XI-XI line.

As shown in FIG. 8, an emergency lever 551 protrudes and elongates outwardly from the vicinity of the central part of the link arm 54. The emergency lever 551 has a base portion 551a, a weight 551b, a lever body portion 551c, and a manipulation portion 551d. The base portion 551a is attached to the vicinity of the central part of the link arm 54. The lever body portion 551c is the planar member that elongates from the base portion 551a. The weight 551b adds weight to a part of the lever body portion 551c and can be formed, for example, by increasing the thickness of the part of the lever body portion 551c. The weight 551b is arranged in the vicinity of the end portion of the lever body portion 551c. The manipulation portion 551d is the portion that is manipulated manually when the emergency lever 551 is moved.

The emergency lever 551 is formed integrally with the link arm 54 and can rotate the link arm 54 on the supporting shaft 502 by manipulating manually the manipulation portion 551d. Therefore, as shown in FIG. 8, the rotation of the rod member 2 can be stopped by pushing the manipulation portion 551d downwardly such that the engagement member 51 engages with the engaged member 52 when the engagement member 51 and the engaged member 52 are not engaged with each other due to the movement of the solenoid 53.

The weight 551b is formed such that the weight is applied in the direction opposite to the direction of the movement of the link arm 54 due to the movement of the solenoid 53. As shown in FIG. 8, if the link arm 54 rotates anti-clockwise due to the movement of the solenoid 53, the weight of the weight 551b is applied in the directed such that the weight rotates the link arm 54 clockwise.

The weight 551b is one example of the mechanical structure that inhibits the vibrations of the link arm 54 and the engagement member 51 by applying a force to the link arm 54 (link member) in the direction different from the direction of the movement of the link arm 54 to change the movement when the engagement member 51 vibrates. In addition, in the present embodiment, the weight 551b specifically plays a role of the movement inhibiting portion that applies the force to the link arm 54 in the direction different from the direction of the movement of the link arm due to the movement of the solenoid 53.

The operation of the rotation inhibiting unit 5 formed as above will be described below.

If the movable pin 531 of the solenoid 53 moves in the retracting direction, the solenoid connection hole 542 of the link arm 54 is pulled by the link pin 532. At this timing, as shown in FIG. 8, the link arm 54 rotates in L1 direction around the supporting shaft 502 and the engagement portion connection hole 543 pulls the supporting shaft 513. Thus, the engagement member 51 moves to the engagement release position P1 (see FIG. 8 and FIG. 10) where the engagement member 51 is away from the rod member 2, namely, the engagement with the engaged member 52 is released and the rod member 2 can rotate. It should be noted that, as described above, since the solenoid 53 is a self-holding type solenoid, the engagement member 51 is maintained at the engagement release position P1 even if the supply of electric power to the solenoid 53 is stopped.

As described above, the link arm 54 is connected to the movable pin 531 of the solenoid 53 via the link pin 532. The emergency lever 551 is formed integrally with the link arm 54. Moreover, the weight 551b, which is configured to apply the weight in the direction different from the direction of the movement of the link arm 54 due to the movement of the solenoid 53, is provided in the emergency lever 551.

Because of the above, the impulsive noise, which is generated when the movable pin 531 abuts the fixed iron core inside the solenoid 53 when the movable pin 531 of the solenoid 53 moves in the retracting direction, is reduced or the tone range of the impulsive noise is changed.

On the other hand, when the movable pin 531 of the solenoid 53 moves in the protruding direction, the solenoid connection hole 542 of the link arm 54 is pushed by the link pin 532. At this timing, as shown in FIG. 9, the link arm 54 rotates in R1 direction in the Figure on the supporting shaft 502 and the engagement portion connection hole 543 pushes the supporting shaft 513. Thus, the engagement member 51 approaches the rod member 2 and moves to the engagement position P2 (see FIG. 9 and FIG. 11) where the engagement member 51 engages with the engaged member 52. It should be noted that, as described above, since the solenoid 53 is a self-holding type solenoid, the engagement member 51 is maintained at the engagement position P2 even if the supply of electric power to the solenoid 53 is stopped. As such, the solenoid can move between the engagement release position P1 and the engagement position P2 by the solenoid 53.

Next, the operation of the driving device for opening and closing A will be described, referring to the figures. In the driving device for opening and closing A, the rotation power outputted from the motor M is transmitted to the rod member 2 via the clutch 1. When the clutch 1 and the motor M are energized, the rotation power generated by driving the motor M is transmitted to the rod member 2.

When the engagement member 51 of the rotation inhibiting unit 5 is positioned at the engagement release position P1 (see FIG. 8 and FIG. 10), the rotation inhibiting unit 5 is in the state where the rotation inhibiting unit 5 does not inhibit the rotation of the rod member 2 because the engagement member 51 and the engaged member 52 are in the state where they are separated from each other. In this state, the rod member 2 is rotated by the rotation power of the motor M. By rotating the rod member 2, the nut member 3, which has the female-threaded portion 31 that is screwed with the screw portion 23 of the rod member 2, moves along the guide rail 20.

As shown in FIG. 1, since the driving device for opening and closing A, the connection member 4, and the opening/closing body Dr form the link mechanism, the opening/closing body Dr moves around the supporting point Fc in the opening direction or the closing direction. It should be noted that the direction of the movement of the nut member 3 is determined by the rotation direction of the rod member 2. Namely, the direction of the movement (the opening direction or the closing direction) of the opening/closing body Dr is determined by the rotation direction of the rod member 2. As such, the opening/closing body Dr can open or close by switching the rotation direction of the motor M.

Since the opening/closing body Dr, which is arranged at the back opening of the vehicle Cr, opens while rotating backwardly, a large space is required in the back part of the vehicle Cr in the opening/closing operation. When the opening/closing body Dr is opened at the place where there is no enough space, the user wants to open the opening/closing body Dr to make the opening smaller due to rain and/or wind, or the opening/closing body Dr is about to touch a person, a wall, or etc., it is required to stop the opening/closing body Dr at the intermediate position of full opening or closing and maintain the position of the opening/closing body Dr. In other words, this type of opening/closing body Dr is required to stop at arbitral positions between the full-open position and the full-close position and maintain its position.

In order to maintain the opening/closing body Dr at arbitral positions in the middle of opening and closing, in the driving device for opening and closing A of the present invention, the method to inhibit the rotation of the rod member 2 using the rotation inhibiting unit 5 is used. The method to inhibit the rotation of the rod member 2 will be described below.

The solenoid 53 of the rotation inhibiting unit 5 is operated to protrude the movable pin 531. Thus, the engagement member 51 moves via the link arm 54 from the engagement release position P1 to the engagement position P2. At this timing, the engagement portion 511 of the engagement member 51 engages with the engagement concave portion 523 of the engaged member 52. Thus, the movement of the engaged member 52 is inhibited by the engagement member 51 and the rotation of the rod member 2, which is key-connected with the engaged member 52, is also inhibited. Thus, the movement of the nut member 3 is stopped and the opening/closing body Dr is stopped. It should be noted that, as described above, since the solenoid 53 is a self-holding type solenoid, the solenoid 53 is maintained in the state where the movable pin 531 is protruded. Thus, the engagement member 51 is also maintained at the engagement position P2 (see FIG. 9 and FIG. 11) where the engagement portion 511 engages with the engagement concave portion 523.

When the movable pin 531 of the solenoid 53 protrudes, it is possible that an impulsive noise is generated when the engagement portion 511 of the engagement member 51 abuts the engagement concave portion 523 of the engaged member 52. Also in this case, since the vibration is transmitted to the weight 551*b* arranged in the emergency lever 551 via the link arm 54 and the engagement member 51, the impulsive noise can be reduced, or the tone range of the impulsive noise can be changed. Therefore, the impulsive noise transmitted to the user can be reduced, thereby preventing the user from feeling uncomfortable.

It should be noted that, when the engagement member 51 moves from the engagement release position P1 to the engagement position P2, there is the case where, during the rotation of the rod member 2, the engagement portion 511 touches the part of the outer periphery of the engaged member 52 on which no engagement concave portion 523 is formed. In this case, since the engagement portion 511 is inserted into the adjacent engagement concave portion 523 by the rotation of the rod member 2, the engagement member 51 is engaged with the engaged member 52 and the rotation of the rod member 2 is inhibited.

In addition, since the direction of the movement of the engagement member 51 is perpendicular to the axis of the rod member 2, and the force, which is applied to the engagement portion 511 from the side wall of the engagement concave portion 523 when the engagement portion 511 of the engagement member 51 engages with the engagement concave portion 523 of the engaged member 52, crosses the direction of the movement of the engagement member 51. On the other hand, the opening/closing body Dr pushes the connection member 4 downward (in the closing direction) by its gravitational force. The nut member 3, which is pushed by the connection member 4, generates the rotation force in the rod member 2. The side wall of the engagement concave portion 523 pushes the engagement portion 511 by this rotation force. The pushing force of the side wall of the engagement concave portion 523 applied to the engagement portion 511 hardly pushes back the engagement member 51, and even if the above-described force is applied to the engagement portion 511, the holding force of the solenoid 53 can maintain the engagement member 51 at the engagement position P2.

With the driving device for opening and closing A according to the present invention, since the engagement member 51 engages mechanically with the engaged member 52, the opening/closing body Dr can be stopped securely at arbitral positions.

In this case, the link arm 54 (one example of the link arm), which moves the engagement member 51 in accordance with the movement of the solenoid 53 (one example of the solenoid), is arranged, and by changing the vibration condition of the engagement member 51 to inhibit the vibration, the noise generated due to the movement of the solenoid 53 is reduced, or the tone range of the noise is changed, thus the uncomfortable feeling of the user can be reduced.

It should be noted that the mechanical structure that inhibits the vibration by changing the vibration condition of the engagement member in the link member is not limited to the form of the emergency lever 551 of the above-described embodiment.

In addition, although, in the present embodiment, the above-described mechanical structure is the movement inhibiting portion that applies the force to the link arm 54 in the direction different from the direction of the movement of the link arm 54 due to the movement of the solenoid, the mechanical structure may have other mechanisms to change the vibration condition of the engagement member 51 in the link arm 54. The structure that can change the vibration condition of the engagement member with the stably-working mechanical structure can be used, such as, for example, the structure generating the moment in the direction different from the engagement direction of the engagement member due to the weight of the thicker part of the link arm, the structure generating the moment in the direction different from the engagement direction of the engagement member due to the changes of the shape and material, and etc.

Moreover, in the present embodiment, the movement inhibiting portion is the weight 551*b* that is arranged in the vicinity of the end portion of the emergency lever 551 attached to the link arm 54 and elongating, the existence or non-existence of the elongating member, and the position and shape of the weight is not limited to the above-described embodiment.

By changing the weight and/or shape of the weight in accordance with the size and/or material of the solenoid 53, the engagement member 51, the link arm 54, the emergency lever 551, and etc., the reduction of the impulsive noise and/or the change of the tone range can be adjusted arbitrarily.

Thus, it is inhibited that the user feels uncomfortable by the impulsive noise during the movement of the solenoid 53.

The consumption of electric power can be reduced since it is not required to supply electric power to the solenoid 53 after the engagement member 51 is engaged with the engaged member 52. In addition, in the driving device for opening and closing A of the present invention, since the opening/closing body Dr is maintained at arbitral positions by the mechanical engagement of the engagement member 51 with the engaged member 52, the supply of electricity to the clutch 1 can be stopped. Thus, compared to the conventional device in which the rod member 2 is maintained by the clutch, the wear of the clutch can be reduced and the durability of the clutch can be increased.

In addition, the rod member and the nut member may have a ball screw structure. By using a ball screw structure, the friction between the screw and the female threads during the movement of the nut member can be reduced and the wear of the rod member and/or the nut member can be reduced. In addition, by reducing the friction, the output of the motor can be reduced and the consumption of electric power can be reduced.

The present invention is not limited to the above-described invention and any modifications can be made within the scope of the invention.

The present invention can be used as the opening/closing apparatus that opens and closes the flip-up type opening/closing body such as a rear door, a trunk lid, or etc. by electric power.

The invention claimed is:

1. A driving device for opening and closing an opening/closing body of a vehicle, the driving device for opening and closing comprising:
   a motor;
   a rod member having male threads formed on an outer surface thereof;
   a clutch configured to transmit or cut a rotation power of the motor to the rod member;
   a nut member screwed with the rod member and configured to move linearly by the rotation of the rod member;
   a connection member configured to open and close the opening/closing body by the linear movement of the nut member; and
   a rotation inhibitor configured to inhibit the rotation of the rod member, the rotation inhibitor comprising:
      an engagement member configured to move between an engagement position and an engagement release position;
      an engaged portion arranged on the rod member and configured to inhibit the rotation of the rod member by engaging with the engagement member;
      a solenoid configured to move the engagement member; and
      a link member configured to move the engagement member in accordance with a movement of the solenoid, the link member having a mechanical structure configured to reduce a vibration by changing a vibration condition of the engagement member, the mechanical structure having a movement inhibiting portion configured to apply a force to the link member in a direction different from a direction of the movement of the link member generated by the movement of the solenoid.

2. The driving device according to claim 1, wherein the movement inhibiting portion is a weight arranged in a vicinity of an end portion of an elongating member attached to the link member.

3. A driving device for opening and closing an opening/closing body of a vehicle, the driving device for opening and closing comprising:
   a motor;
   a rod member having male threads formed on an outer surface thereof;
   a clutch configured to transmit or cut a rotation power of the motor to the rod member;
   a nut member screwed with the rod member and configured to move linearly by the rotation of the rod member;
   a connection member configured to open and close the opening/closing body by the linear movement of the nut member; and
   a rotation inhibitor configured to inhibit the rotation of the rod member, the rotation inhibitor comprising:
      an engagement member configured to move between an engagement position and an engagement release position, the engagement member being formed in a convex shape and arranged such that the engagement member moves in a direction perpendicular to an axis direction of the rod member;
      an engaged portion arranged on the rod member and configured to inhibit the rotation of the rod member by engaging with the engagement member, the engaged portion being formed as a plurality of concaves arranged on an outer periphery of the rod member, the concaves being provided defining a predetermined space in a rotation direction of the rod member between each other;
      a solenoid configured to move the engagement member; and
      a link member configured to move the engagement member in accordance with a movement of the solenoid, the link member having a mechanical structure configured to reduce a vibration by changing a vibration condition of the engagement member, the mechanical structure having a movement inhibiting portion configured to apply a force to the link member in a direction different from a direction of the movement of the link member generated by the movement of the solenoid.

4. The driving device according to claim 3, wherein the movement inhibiting portion is a weight arranged in a vicinity of an end portion of an elongating member attached to the link member.

* * * * *